United States Patent
Kay (10) Patent No.: US 10,107,614 B1
(45) Date of Patent: Oct. 23, 2018

(54) OPTICAL PEN FOR INTERFEROMETRIC MEASURING MACHINE

(71) Applicant: Quality Vision International, Inc., Rochester, NY (US)

(72) Inventor: David B. Kay, Rochester, NY (US)

(73) Assignee: Quality Vision International, Inc., Rochester, NY (US)

( * ) Notice: Subject to any disclaimer, the term of this patent is extended or adjusted under 35 U.S.C. 154(b) by 0 days.

(21) Appl. No.: 15/490,749

(22) Filed: Apr. 18, 2017

(51) Int. Cl.
G01B 9/02 (2006.01)
G01B 11/14 (2006.01)

(52) U.S. Cl.
CPC .......... G01B 9/02035 (2013.01); G01B 11/14 (2013.01)

(58) Field of Classification Search
CPC .. G01B 11/14; G01B 9/02049; G01B 9/0205; G01B 9/02054
See application file for complete search history.

(56) References Cited

U.S. PATENT DOCUMENTS

| | | | |
|---|---|---|---|
| 5,133,601 A | 7/1992 | Cohen et al. | |
| 5,349,440 A | 9/1994 | DeGroot | |
| 5,706,085 A | 1/1998 | Blossey et al. | |
| 5,943,133 A | 8/1999 | Zeylikovich et al. | |
| 6,490,046 B1 | 12/2002 | Drabarek et al. | |
| 6,721,094 B1 | 4/2004 | Sinclair | |
| 6,985,232 B2 | 1/2006 | Sezginer | |
| 7,034,271 B1 | 4/2006 | Sinclair et al. | |
| 7,271,918 B2 | 9/2007 | De Groot et al. | |
| 7,339,679 B2 | 3/2008 | Drabarek et al. | |
| 7,365,859 B2 | 4/2008 | Yun et al. | |
| 7,400,408 B2 | 7/2008 | Drabarek et al. | |
| 7,446,882 B2 | 11/2008 | De Lega et al. | |
| 7,636,168 B2 | 12/2009 | De Lega et al. | |
| 7,791,731 B2 | 9/2010 | Kay | |
| 7,995,210 B2 | 8/2011 | Tearney et al. | |
| 8,345,257 B2 | 1/2013 | Bonnema et al. | |
| 8,442,284 B2 | 5/2013 | Rogers et al. | |
| 9,091,523 B2 | 7/2015 | Kay | |

(Continued)

FOREIGN PATENT DOCUMENTS

WO 20170184345 A1 10/2017

OTHER PUBLICATIONS

Jan Niehues, Peter Lehmann and Weichang Xie, Low coherent Linnik interferometer optimized for use in Nano Measuring Machines, 56th International Scientific Colloquium, Ilmenau University of Technology, Sep. 12-16, 2011.

(Continued)

*Primary Examiner* — Jonathan Hansen
(74) *Attorney, Agent, or Firm* — Thomas B. Ryan; Harter Secrest & Emery LLP (57) ABSTRACT

An optical pen for an optical measurement system includes a probe body arranged to be adjustably mounted in a measuring machine for optically measuring a test object. A single mode fiber optically coupled within the pen body transmits a source beam having an instantaneous or sequentially established bandwidth spanning a range of wavelengths to the pen body and also transmits a measurement beam from the pen body toward a detector. A combination and configuration of optics within the pen body provides a more compact and efficient optical pen.

39 Claims, 5 Drawing Sheets

(56) References Cited

U.S. PATENT DOCUMENTS

| | | | |
|---|---|---|---|
| 2004/0090635 A1* | 5/2004 | Franz | B23Q 17/20 356/498 |
| 2006/0215170 A1 | 9/2006 | Toida et al. | |
| 2009/0021723 A1 | 1/2009 | DeLega | |
| 2009/0040521 A1 | 2/2009 | Hu et al. | |
| 2009/0153839 A1 | 6/2009 | Kay | |
| 2011/0149245 A1 | 6/2011 | Barth | |
| 2011/0304856 A1 | 12/2011 | Ge et al. | |
| 2012/0133946 A1 | 5/2012 | Eckman et al. | |
| 2012/0138586 A1 | 6/2012 | Webster | |
| 2012/0147356 A1 | 6/2012 | Necsoiu et al. | |
| 2014/0160482 A1* | 6/2014 | Tearney | G01B 9/02044 356/451 |
| 2014/0293286 A1 | 10/2014 | Kapit et al. | |
| 2014/0362383 A1 | 12/2014 | Haitjema | |
| 2017/0307352 A1 | 10/2017 | Kay | |

OTHER PUBLICATIONS

New Linnik interferometer objective—Sensofar, New Linnik Interferometer Objective, Metrology, Products| May 14, 2010.

S. K. Debnath, N. Krishna Mohan, D. K. Sharma, M. P. Kothiyal, Optical profiling using white light interference in spectral domain, Applied Optics Laboratory, Department of Physics Indian Institute of Technology Madras, Chennai-600 036, India.

Arnaud Dubois, "Full-Field Optical Coherence Microscopy, Selected Topics in Optical Coherence Tomography," InTech, Published online Feb. 8, 2012.

I. Malinovsky, R. S. Franca, I. B. Couceiro, M. S. Lima, C. L. S. Azeredo, C. M. S. Almeida, J. P. Weid, "Primary Maging Interference Microscope for Nanometrology," XX IMEKO World Congress Metrology for Green Growth, Sep. 9-14, 2012, Busan, Republic of Korea.

W. Y. Oh, B.E. Bouma, N. Iftimia, R. Yelin, and G.J. Tearney, "Spectrally-modulated full-field optical coherence microscopy for ultrahigh-resolution endoscopic imaging," NIH Public Access Author Manuscript, Opt Express. (Sep. 18, 2006); 14(19): 8675-8684.

Gerd Hausler and Michael Walter Lindner, "'Coherence Radar' and 'Spectral Radar'—New Tools for Dermatological Diagnosis," J. Biomed. Opt. 3(1), 21-31 (Jan. 1, 1998).

Chan et al., "Techical Note a Simple Thermal Phase Stabilizer for Real-Time Optical Fibre Holographic Interferometry", Optics and Laser Technology, vol. 24, No. 6, Dec. 31, 1992.

Kaura et al., "In-Situ Non-Destructive Testing Studies Using Fiber Optical Holographic Techniques", Laser Applications in Material Science and Industry, Dec. 31, 1997, pp. 59-62.

International Search Report and Written Opinion from counterpart International Patent Application No. PCT/US2017/026193.

International Search Report and Written Opinion for Patent Application PCT/US2018/027971 dated Jul. 23, 2018.

* cited by examiner

OPTICAL PEN FOR INTERFEROMETRIC MEASURING MACHINE

TECHNICAL FIELD

In the field of optical metrology, coordinate measuring machines can be arranged to acquire point-by-point interferometric measurements of test objects using optical pens for directing light to and from the test objects. Optics for producing interference as a form of measurement can be contained within the optical pens.

BACKGROUND

Point-by-point measurements of relative optical path length displacements can be made over a range of such optical displacements by measuring rates of interferometric phase variation with wavenumber. For example, a spatially coherent source beam composed of multiple wavelengths, i.e., a low temporally coherent beam, or a succession of different wavelengths can be divided by a beamsplitter into an object beam that is reflected from the test object and a reference beam that is reflected from a reference reflector. Reflected light from both the test object and the reference reflector is recombined at a beamsplitter into a measurement beam and refocused within a detector such as a spectrometer, which records interference intensities of the different spectral components of the returning measurement beam. Based on the relationship between (a) the rate of change in interference phase with the change in beam frequency, referred to a modulation frequency, and (b) the optical path length difference between the object and reference beams, the relative optical displacements between different measured points can be ascertained.

The interferometric components that divide the source beam into object and reference beams and then recombine the object and reference beams into a common measurement beam can be contained within an optical pen that also directs the object beam to and from a test object. Assembling the interferometric components together within the optical pen can diminish the possibility of unwanted disturbances having differential effects on the object and reference beams, which can reduce measurement accuracy and reliability.

However, the number and complexity of components required to house an interferometer within an optical pen can add bulk and complexity to the optical pen, which must be relatively movable with respect to a test object to acquire a range of measurement points on the test object. Particularly in instances where the optical path lengths of the object and reference beams traversing respective object and reference arms of the interferometer are required to be of comparable length, the two arms of the interferometer can add to the size and distort the shape of the optical pen in ways that can interfere with the required relative movement of the optical pen over test objects having various surface shapes. For example, while the object arm can be aligned with a central axis of the optical pen, the reference arm is generally offset from the central axis, which both increases the size and distorts the shape of the optical pen from axial symmetry. Interferometric arrangements such as Mirau interferometers can significantly reduce the working distance between the optical pen and test objects.

SUMMARY OF INVENTION

Among the embodiments, more compact and axially symmetric optical pens are presented that overcome the noted deficiencies and provide for such purposes as expanding measurement opportunities for the optical pens particularly in small working spaces, reducing the complexity and number of interferometric components within the optical pens, and further diminishing possibilities for disturbances affecting the interferometric function of the optical pens.

For example, an optical pen for taking interferometric distance measurements over a plurality of points on a test object features includes, inter alia, a pen body arranged for receiving an end of single mode optical fiber for conveying a source beam to the pen body and for conveying a measurement beam from the pen body to a remote detector. A first focusing optic supported by the pen body collimates the source beam emitted from the end of the single mode fiber. A beamsplitter supported by the pen body transmits a first portion of the source beam as an object beam and reflects a second portion of the source beam as a reference beam at a non-normal angle of incidence back through the first focusing optic. A second focusing optic supported by the pen body focuses the object beam beyond the pen body to an object focus proximate the test object and collimates the object beam reflected from the test object as a returning object beam. A reference reflector reflects the reference beam as a returning reference beam back through the first focusing optic to the beamsplitter. The beamsplitter transmits the returning object beam and reflects the returning reference beam into alignment with the returning object beam thereby combining the returning object and reference beams into the measurement beam. The first focusing optic focuses the measurement beam into the end of the single mode fiber for conveying the measurement beam from the pen body to the remote detector.

In the referenced example, the first focusing optic is traversed once each by the source beam and the measurement beam and is traversed twice by the reference beam (i.e., as the reference beam and returning reference beam). The second focusing optic is traversed twice by the object beam (i.e., as the object beam and the returning object beam). Thus, the same focusing optic that is used for collimating the source beam and focusing the measurement beam is also used for both collimating and focusing the reference beam, eliminating the need for a separate focusing optic to appropriately shape the reference beam.

The first focusing optic includes an optical axis and a beamsplitter preferably includes an at least partially reflective surface that is inclined at a non-normal angle to the optical axis of the first focusing optic. In this regard, the at least partially reflective surface departs by no more than three degrees from a normal to the optical axis of the first focusing optic so that the reference beam overlaps the source and measurement beams along a substantial portion of their respective paths. The overlap between the reference beam and the source and measurement beams allows for a more compact design. In addition, the first and second focusing optics can share aligned optical axes. All of the beams, including the source, object, reference, and measurement beams preferably propagate along the same or nearly the same axes, which limits the possibility for relative disturbances differentially affecting the beams.

However, the slight angular departure of the reference beam from the source and measurement beams effected at the beamsplitter can be expressed in a number of different ways in relation to the orientations of the optical axes of the first and second focusing optics. For example, the common optical axis of the source and measurement beams can be aligned with the optical axis of the first focusing optic and the optical axis of the reference beam can be inclined with respect to the optical axis of the first focusing optic. Alternatively, the optical axis of the reference beam can be aligned with the optical axis of the first focusing optic and the common optical axis of the source and measurement beams can be inclined with respect to the optical axis of the first focusing optic.

Particularly when the reference beam propagates in a slightly off-axis direction through the first focusing optic, dispersive or other aberrational effects can be minimized by limiting the reference beam to central or paraxial rays of the source beam. For example, the partially reflective surface can be arranged to reflect central or paraxial rays of the source beam along a reference optical axis that is inclined to a common optical axis of the source and measurement beams without similarly reflecting or otherwise impeding the transmission of more marginal rays of the source beam which form the object beam.

The beamsplitter can be formed as a transmissive plate including the at least partially reflective surface, and the transmissive plate can be inclined at the non-normal angle to the optical axis of the first focusing optic. Preferably, the transmissive plate includes front and back surfaces inclined at the non-normal angle to the optical axis of the first focusing optic, and the at least partially reflective surface is formed as a reflective coating occupying a portion of one of the front and back surfaces centered about the optical axis of the first focusing optic. In the same or a different way, the beamsplitter can include a centrally disposed reflector that is inclined at the non-normal angle and is bordered by a transmissive region. The centrally disposed reflector is preferably shaped as a disc (e.g., a circle or oval shaped area) but could also be shaped as an annulus.

For extending the optical pathway of the reference beam while limiting its spatial divergence from the volume occupied by the source and measurement beams, an intermediate reflector can be provided for folding the pathway of the reference beam en route to and from the reference reflector. Preferably, the pathway of the reference beam is folded across the common optical axis of the source and measurement beams. As such, the reference reflector can be positioned about the radial periphery of the pen body in a location that is more easily subject to adjustment.

The end of the single mode fiber preferably defines an acceptance cone through which light enters the single mode fiber. The reference reflector is preferably adjustable along the reference optical axis to defocus the returning reference beam for balancing beam energies between the returning reference beam and the returning object beam portions of the measurement beam within the acceptance cone of the single mode fiber. Particularly in the situation where the partially reflective surface is centered within a portion of the beamsplitter for reflecting central or paraxial rays of the source beam without also reflecting more marginal rays of the source beam, the reference reflector is preferably positioned along the reference optical axis at an optical distance from the first focusing optic that is substantially equal to or greater than the focal length of the first focusing optic so that the returning reference beam does not expand beyond the partially reflective surface.

The object beam and returning object beam can be arranged to travel along an object optical axis between the beamsplitter and the object focus through a first optical distance, and the reference beam and returning reference beam can be arranged to travel along a reference optical axis between the beamsplitter and the reference reflector through a second optical distance. As so arranged, the first and second optical distances are preferably offset by an amount to avoid a null interference condition. This can be accomplished by adjusting the axial position of the second focusing optic. In addition, the first and second focusing optics can be corrected to limit chromatic dispersion, and dispersions associated with transmissions of light comprising the reference beam through the first focusing optic can be matched to transmissions of light comprising the object beam through the first and second focusing optics.

The embodiments also include a method of taking interferometric distance measurements over a plurality of points on a test object with an optical measurement system having an optical pen connected to both a light source and a detector through a single mode fiber. A source beam emitted from an end of the single mode fiber is collimated through a first focusing optic of the optical pen. The source beam can include an instantaneous or sequentially established bandwidth spanning a range of wavelengths. At a beamsplitter, the collimated source beam is divided into (a) an object beam that is transmitted through a second focusing optic of the optical pen to an object focus proximate a test object and (b) a reference beam that is reflected at a non-normal angle of incidence back through the first focusing optic to a reference reflector of the optical pen. The object beam reflected from the test object as returning object beam is collimated through the second focusing optic. The reference beam reflected from the reference reflector as a returning reference beam is similarly collimating through the first focusing optic. The returning object and reference beams are combined at the beamsplitter into a measurement beam that is transmitted through the first focusing optic on a converging path to the end of the single mode fiber.

Preferably, the step of combining the returning object and reference beams includes transmitting the returning object beam through the beamsplitter and reflecting the returning reference beam form the beamsplitter into alignment with the returning object beam. The resulting measurement beam is preferably focused into the end of the single mode fiber within an acceptance cone of the single mode fiber.

The step of dividing the collimated source beam at a beamsplitter preferably includes reflecting a portion of the source beam as the reference beam in a direction that is inclined to a common optical axis of the source and measurement beams by no more than six degrees. Reflecting the portion of the source beam as the reference beam preferably includes reflecting central or paraxial rays of the source beam without similarly reflecting more marginal rays of the source beam which form the object beam. In addition, both the reference beam and the returning reference beam can be further reflected along a folded pathway en route to and from the reference reflector. Preferably, the folded pathway intersects a pathway of the source and measurement beams so that more of a volume occupied by the reference and returning reference beams remains within a volume occupied by the source and measurement beams.

In addition, the reference reflector can be adjusted along the reference optical axis to defocus the returning reference beam for balancing beam energies between the returning reference beam and the returning object beam portions of the measurement beam within the acceptance cone at the end of the single mode fiber. Especially in the case where the step of reflecting the portion of the source beam as the reference beam includes reflecting central or paraxial rays of the source beam without similarly reflecting more marginal rays of the source beam, the reference reflector is preferably positioned at an optical distance from the first focusing optic that is substantially equal to or greater than a focal length of the first focusing optic.

DETAILED DESCRIPTION

Figure 1:
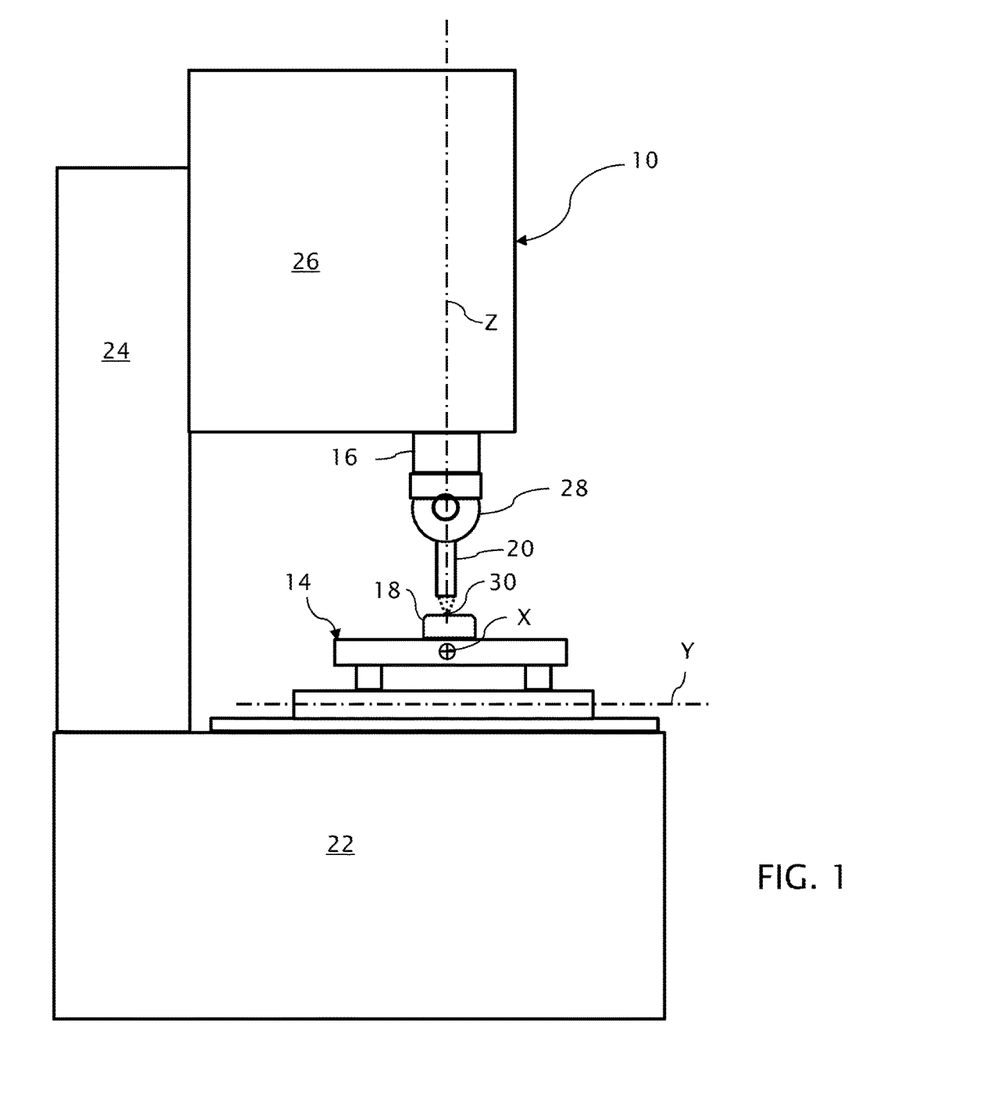
FIG. 1 is a schematic side elevational view of a multi-axis measuring machine with a vertically displaceable slide mechanism.

A multi-axis machine 10 depicted in FIG. 1 is one of many possible configurations of an optical measuring machine, includes an x-y stage 14 for horizontally translating a test object 18 along X and Y coordinate axes and a slide mechanism 16 for vertically translating an optical pen 20 (as the visible portion of an interferometer probe) along a Z coordinate axis. The x-y stage 14 is supported on a machine base 22. The slide mechanism 16 is supported in a slide support 26 carried on a column 24. The optical pen 20 is carried on an articulated arm 28 that is both pivotal about a horizontal axis and rotatable together with the pivot axis about the Z coordinate axis, although the optical pen 20 could be fixed mounted to the Z coordinate axis. Other unseen portions of the probe optics, including one or more light sources and a detector, or other apparatus supporting the metrology functions of the machine 10 can be housed in the slide support 26 within which the slide mechanism 16 is translatable. Relative motions between the optical pen 20 and the test object 18 are measured along or about the various axes to monitor the relative position of the optical pen 20 with respect to the test object 18 within a common coordinate system. Besides the optical pen 20, a multi-axis machine may also include vision systems and other probes mounted to the Z coordinate axis.

The measuring machine 10 can be arranged with other combinations of rotational and translational axes for relatively moving one or the other of the test object 18 and the optical pen 20. Preferably, for gathering information about the test object 18, such as empirical descriptions of test object profiles, the relative motions provide for maintaining an optical focus 30 of light emitted through optical elements of the optical pen 20 proximate to the test object 18 over a range of different positions on the test object 18 at orientations effective for collecting specular or diffuse reflections of the light from the test object 18 through the same optical elements of the optical pen 20.

Figure 2:
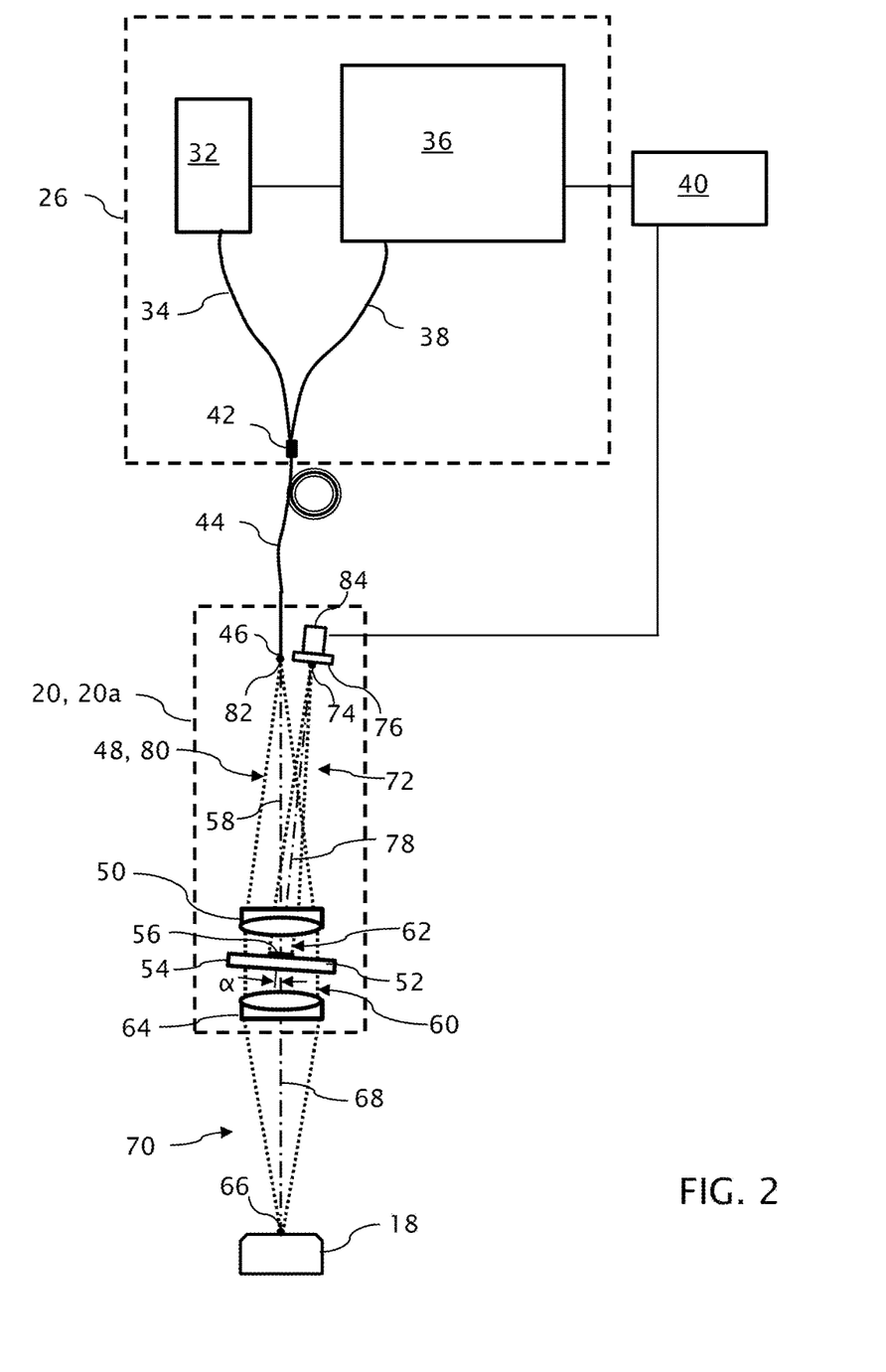
FIG. 2 is a diagram of an optical measurement system for the measuring machine of FIG. 1 in which object and reference arms of an interferometer are mounted in an optical pen and connected to both a light source and a detector by a single mode fiber.

An optical arrangement for taking measurements of the test object 18 with an optical measurement system for the measuring machine 10 is shown in FIG. 2. A light source 32, such as a superluminescent diode, housed in a machine enclosure such as the slide support 26, provides for delivering high spatially coherent but low temporally coherent (i.e., light containing a range of wavelengths over a continuum of wavelengths) to the optical pen 20 through a single mode fiber 34. Preferably within the same enclosure, such as the slide support 26, a detector 36 is arranged for receiving the light returning from the optical pen 20 though a single mode fiber 38. A processor 40 for processing information from the detector 36 is preferably located outside the enclosure for communicating with a user interface (not shown).

Preferably, the gain ripple over the working spectrum is low and the bandwidth is matched together with the operating bandwidth of the detector 36. However, instead of generating an instantaneous bandwidth, the light source 32 can establish a similar bandwidth by generating a succession of different wavelengths over the intended bandwidth. With a single interference phase generated by each wavelength for a given measured point on the test object 18, the detector 36 can be simplified, such as in the form of a simple photodetector.

A fiber coupler 42, which can be a 50%/50% coupler, connects the single mode fibers 34 and 38 to a common single mode fiber 44 for transmitting the high spatially coherent, low temporally coherent light to and from the interferometer probe 20. The single mode fiber 44 can be a single mode polarizing fiber. As schematically shown, the single mode fiber 44 has extra length to accommodate motions of the interferometer probe 20 with respect to the slide support 26.

Within a pen body 20a of the optical pen 20, which is schematically shown coincident with the representative dashed outline of the optical pen 20, the high spatially coherent, low temporally coherent light is emitted from an end 46 of the single mode fiber 44 as a source beam 48 (shown in dotted lines). A first focusing optic 50 within the pen body 20a (shown as a lens doublet) gathers and collimates the source beam 48. A beamsplitter 52 within the pen body 20a divides the collimated source beam 48 into (a) an object beam 60 (shown in dotted lines) that transmits through the beamsplitter 52 and (b) a reference beam 62 (also shown in dotted lines) that is reflected by the beamsplitter 52 at a non-normal angle to an optical axis 58 of the first focusing optic 50.

The beamsplitter 52 is depicted as a transmissive plane-parallel plate 54 with a reflective surface 56 centered on a front surface of the plate 54. The transmissive plane-parallel plate 54 together with a reflective surface 56 is inclined through angle α with respect to the optical axis 58, which is equal to one-half the angle of reflection (i.e., 2 α) at which the reference beam 62 is reflected by the beamsplitter 52. While exaggerated in FIG. 2 for purposes of illustration, the angle α is preferably no more than 3 degrees and is preferably approximately 1.5 degrees.

The reflective surface 56 has a circular shaped area centered about the optical axis 58 for reflecting central or paraxial rays of the source beam 48 as the reference beam 62 without similarly reflecting or otherwise impeding the transmission of the remaining more marginal rays that form the object beam 60. The reflective surface 56 is preferably formed as an optical coating but could also be formed as reflective plate or other such appended reflective body on either the front or back surfaces of the transmissive plate 54. Although still preferably centered with respect to the optical axis 58, the reflective surface 56 could also be shaped in other ways, including as an annular shape. Alternatively, the reflective surface 56 could be formed over all or a portion of either side of the transmissive plate 52 as a partially reflective surface, such as a so-called "half-silvered" surface, to support a similar beamsplitting function.

Upon transmission through the beamsplitter 52, the object beam 60 propagates along an object arm 70 through a second focusing optic 64 within the pen body 20*a* (shown as a lens doublet), which focuses the object beam 60 to an object focus 66 beyond the pen body 20*a* proximate the test object 18. Preferably, the object beam 60 shares an optical axis 68 with the second focusing optic 64, which is also preferably aligned with the optical axis 58 of the first focusing optic.

Upon reflection from the beamsplitter 52, the reference beam 62 propagates along a reference arm 72 back through the first focusing optic 50, which focuses the inclined reference beam 62 to a reference focus 74 proximate a reference reflector 76, which can be in the form of a plane mirror, also within the probe body 20*a*. The reference focus 74 of the reference beam 62 is spatially offset from the end 46 of the single mode fiber 44 by an amount corresponding to a function relating to the angle of reflection (2α) and the focal length of the first focusing optic 50. The reference beam 62 has an optical axis 78 that is similarly inclined to the optical axis 58 of the first focusing optic 50 through approximately 2α, which is preferably set by the inclination of the reflective surface 56 at a minimum angular amount a necessary to reflect the focused reference beam 62 without interfering with the intended propagation of the source beam 48 from the end 46 of the single mode fiber 44 through the first focusing optic 50.

Although the reference beam 62 propagates in a slightly off-axis direction through the first focusing optic 50, aberrational (e.g., coma) effects can be minimized by limiting the content of the reference beam 62 to central or paraxial rays of the source beam 48. As such, the numerical aperture of the reference beam 62 as focused by the first focusing optic 50 is less than the numerical aperture of the object beam 60 as similarly focused by the second focusing optic 64. The limited angular inclination of the reference beam 62 with respect to the source beam 48 together with the limited size of the reference beam 62 contributes to optimizing overlap between the volumes of the source and reference beams 48 and 62, thereby enabling a more compact and axially symmetric pen body 20*a*. Preferably, both of the focusing optics 50 and 64 are achromatic, low dispersion lenses for matching focusing effects of the different wavelengths within the object and reference beams 60 and 62. Lens triplets, aspheric achromats, or other lens designs with more freedoms can be used to accommodate off-axis reference beams of additional size.

Specular or diffuse reflections of the object beam 60 from the test object 18 are collected and re-collimated by the second focusing optic 64 en route back to the beamsplitter 52. Similarly, retroreflections from the reference reflector 76 are collected and substantially re-collimated by the first focusing optic 50 en route back to the beamsplitter 52. At the beamsplitter 52, at least a portion of the returning object beam 60 that transmits through the beamsplitter 52 is recombined with at least a portion of the returning reference beam 62 that reflects from the reflective surface 56 back into alignment with the object beam 60 as a common measurement beam 80, which is focused by the first focusing optic 50 to measurement focus 82 proximate the end 46 of the single mode fiber 44. The end 46 of the single mode fiber 44 receives the measurement beam 80 through the volume of an acceptance cone, which is related generally to the refractive indices of the fiber core and cladding.

Within the detector 36 arranged as a spectrometer, the measurement beam 80 can be re-collimated and reflected off a diffraction grating over a range of spectrally dispersed orientations, and the dispersed orientations of the measurement beam 80 can be focused along a linear array of photodiodes or charge-coupled devices (CCDs). Each different frequency (as a reciprocal of wavelength) from the object beam 60 portion of the measurement beam 80 interferes with the corresponding frequency of the reference beam 62 portion of the measurement beam 80 at a different focus position along the array. The intensity of the light focused along the array, representative of modulo 2π phase differences between the object and reference beam 60, 62 portions of the measurement beam 80, modulates at a detectable frequency, referred to as a modulation frequency that varies within a Nyquist interval (due to pixel sampling) proportional to the optical path length difference between the object and reference beam 60, 62 portions of the measurement beam 80. Since the intensity information is collected by a discrete number of pixels, the distinguishable frequencies generally range from zero up to one-half of the number of pixels involved in the measurement.

Figure 3A:
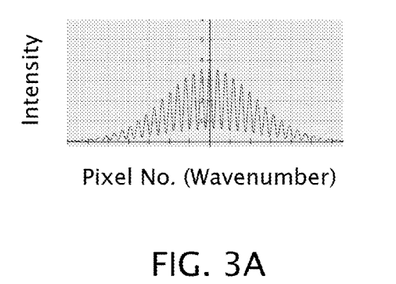
FIGS. 3A and 3B graphically depict two different measurement outputs of the interferometer in which intensity varies as a function of wavenumber at different modulation frequencies associated with different optical path lengths of the object and reference beams.
Figure 3B:
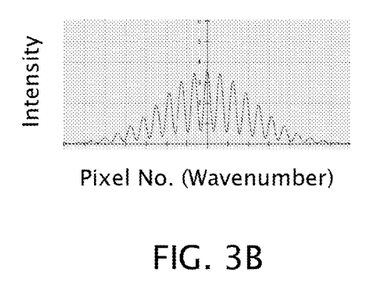
Figure 4:
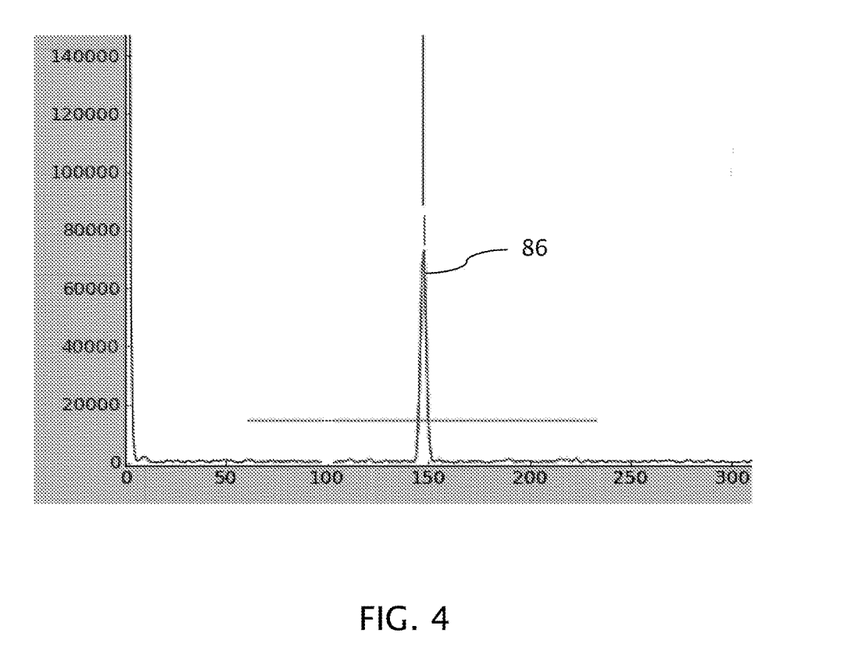
FIG. 4 graphically depicts a calculated output of a processor for identifying a modulation frequency based on the output of the detector.

FIGS. 3A and 3B graph two different examples of intensity variations captured along the linear array pixels and along which the focus positions of the different frequencies (wavenumbers) are dispersed. The variation in intensity corresponding to variations in interference phase is substantially periodic at a measurable frequency, referred to as the modulation frequency. As optical path length differences between the object and reference beam 60, 62 portions of the measurement beam 80 increase from zero (i.e., the null position), the modulation frequency increases proportionally within the Nyquist interval of measurement. For example, the frequency of modulation depicted in FIG. 3A appears higher than the frequency of modulation depicted in FIG. 3B, evidencing a greater optical path length difference between the object and reference beam 60, 62 portions of the measurement beam 80 in the measurement captured by the detector 36 as shown in FIG. 3A versus the measurement of optical path length difference captured by the detector 36 as shown in FIG. 3B. FIG. 4 shows a calculated modulation frequency as a frequency spike 86 within the depicted range of measurement as may be graphically output from the processor 40.

Within the processor 40, the calculated modulation frequency can also be converted into a height on the surface of the test object 18. For gathering data over a range of points on the test object 18 within a common coordinate system, relative motions between the optical pen 20 and the test object 18 are monitored for tracing a position of the object focus 66 of the optical pen 20 in space. During setup, the optical path length difference between the object and reference beams 60, 62 considered at the ideal focus position is set at a given modulation frequency. During measurement, departures from the given modulation frequency interpreted as surface height variations can be added to or subtracted from the measured relative position of the object focus 66 to provide a finer measure of the position of a measured point on the test object 18.

Since departures from the given modulation frequency are also measures of departures from the ideal focus position, the departures from the given modulation frequency can also be used to maintain the focus within a usable range. In other words, the relative position of the optical pen 20 can be corrected by displacing the optical pen 20 along the Z axis to position the ideal focal point closer to the surface of the test object 18 and at a modulation frequency closer to the given modulation frequency. The focus corrections, in turn, maintain the optical pen within both the intended Nyquist interval of measurement and the focal depth of the focusing optic 64.

The accuracy with which the modulation frequency can be determined is in part based on the contrast with which the interference phase modulation is expressed. Since intensity is related to the square of the amplitudes of the waveforms, the highest contrast of the interference phase modulations takes place when the relative intensities of the object and reference beam 60, 62 portions of the measurement beam 80 are equal. The intensity of the returning object beam 60 component of the measurement beam 80 depends upon the reflectivity of the test object 18 at the point of measurement, which can vary considerably between test objects or between different parts of the same test object.

Since the reflectivity of the test object 18 is generally less than the reflectivity of the reference reflector 76, the beamsplitter 52 is preferably arranged to more effectively transmit than reflect light, thereby favoring a distribution of more of the energy of the source beam 48 into the object beam 60 at the expense of the reference beam 62. The size, location, and reflectivity of the reflective surface 56 can be controlled to adjust distributions of energy between the object and reference beams 60 and 62.

To more closely balance the intensities of the reflected object beam 60 and the reflected reference beam 62, a progression of different size portions of the reference beam 62 can be adjustably excluded from being focused within the acceptance cone of the single mode fiber 44. For example, as shown in FIG. 2, the reference reflector 76 can be connected to an adjustable beam manipulator in the form of a linear adjuster 84, such as an adjustment-screw-driven mechanism or drive (e.g., transducer) under the control of the processor 40 or other controller, for displacing the reference reflector 76 along the optical axis 78 of the reference beam 62 to variably defocus the reference beam 62.

Defocusing the reference beam 62 introduces differential amounts of wavefront curvature into the reflected reference beam 62, which expands a focused volume of the measurement beam 80 beyond the acceptance cone of the single mode fiber 44. Increasing defocus excludes a larger portion of the reflected reference beam 62 portion of the measurement beam 80. The adjustment provides a simple and symmetric way of regulating the intensity of the reflected reference beam 62. For determining a desired amount of defocus, interference contrast can be measured within the detector 36 by the overall measured intensity variation, and adjustments to the amount of defocus can be made to better optimize the measured intensity variation.

Figure 5:
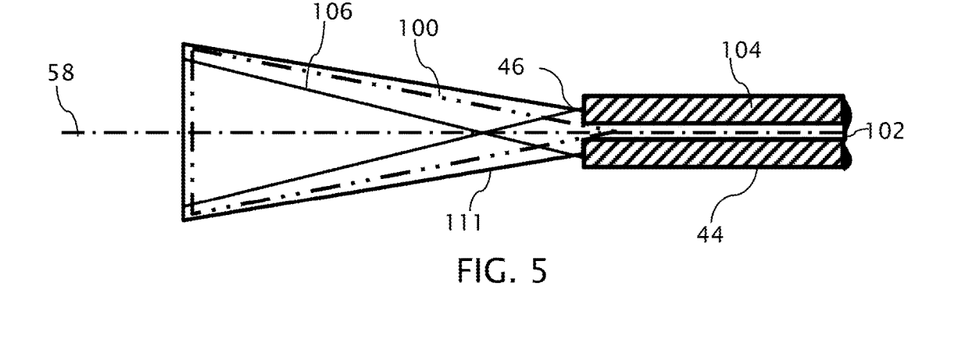
FIG. 5 depicts the effects of a beam manipulator in accordance with the arrangement of FIG. 2 in which a portion of the reference beam is expanded outside an acceptance cone of the single mode fiber.

As shown in FIG. 5, when refocused by the first focusing optic 50, the reference beam 62 portion of the measurement beam 80 contains a larger 111 or smaller 106 range of angles (depending on the direction of defocus) about the optical axis 58 and results in a larger spot size at the end 46 of the single mode fiber 44 such that at least some of the converging elements of the reference beam 62 portion of the measurement beam 80 are oriented outside the acceptance cone 100 (shown in the phantom line) of the single mode fiber 44.

The volume of light capable of entering the single mode fiber 44 is contained in the acceptance cone 100. A cross section of the single mode fiber 44 shows the core 102 of the single mode fiber 44 exposed with a surrounding cladding 104. Another cone 106 shown in solid line represents the reference beam 62 portion of the measuring beam 80 subject to being defocused by the reference reflector 76 on a path converging before the end 46 of the single mode fiber 44. While the cone 106 still converges in a symmetric fashion about the optical axis 58 of the first focusing optic 50, the cone 106 has angular elements that are distributed outside the acceptance cone 100. As a result, the relative intensity of the reference beam 62 portion of the measuring beam 80 is reduced with respect to the object beam 60 portion of the measuring beam 80. The relative intensity of the reflected object beam 60 can be monitored during the course of measurement to determine whether more or less defocus is required to rebalance the intensities of the object beam 60 and reference beam 62 portions of the measurement beam 80.

Particularly in the situation where the reflective surface 56 is centered within a portion of the beamsplitter plate 54 for reflecting central or paraxial rays of the source beam 48 without also reflecting more marginal rays of the source beam 48, the reference reflector 76 is preferably positioned along the reference optical axis 78 at an optical distance from the first focusing optic 50 that is substantially equal to or greater than the focal length of the first focusing optic 50 so that the returning reference beam 62 does not expand beyond the reflective surface 56. While such an expansion is unlikely to have much effect on the primary modulation frequencies, stray light remaining within the optical apertures of the focusing optics 50 and 64 could increase background radiation. For example, the returning reference beam 62 could be focused by the second focusing optic 64 to an offset focus spot on the test object 18.

The object beam 60 can be arranged to travel along the object optical axis 68 between the beamsplitter 52 and the object focus 66 through a first optical distance, and the reference beam 62 can be arranged to travel along the reference optical axis 78 between the beamsplitter 52 and the reference reflector 76 through a second optical distance. As so arranged, the first and second optical distances are preferably offset by a minimum amount to avoid a null interference condition. However, considering the need for a long working distance between the pen body 20a and the object focus 66, which tends to extend the optical path length of the object beam 60, the optical path length of the reference beam 62 is therefore preferably nearly as long or longer. The second focusing optic 64 can be adjusted along its axis 68 to provide the desired offset.

Particularly for the purposes of (a) returning the measurement beam 80 in a form that can be focused as desired into the end 46 of the single mode fiber 44 and (b) avoiding unintended differential effects between the object and reference beams, the various optics including the first and second focusing optics 50 and 64 are preferably arranged to minimize or otherwise control chromatic dispersion and other aberrations. Overall, the aberrations are preferably minimized to assure that the measurement beam can be focused as desired into the end 46 of the single mode fiber 44. The aberrations are also preferably minimized or otherwise balanced between the object and reference beam components of the propagating beams to avoid unintended effects on the measurements. For example, the light that comprises the object beam propagates twice through each of the first and second focusing optics 50 and 64, whereas the light that comprises the reference beam propagates four times through the first focusing optic 50. Any differential aberrational effects associated with the different paths of transmission are preferably minimized. While the light that comprises the object and reference beams propagates together within the source and measurement beams 48 and 80, different paths of propagation through the first focusing optic 50 are also preferably taken into account.

Figure 6:
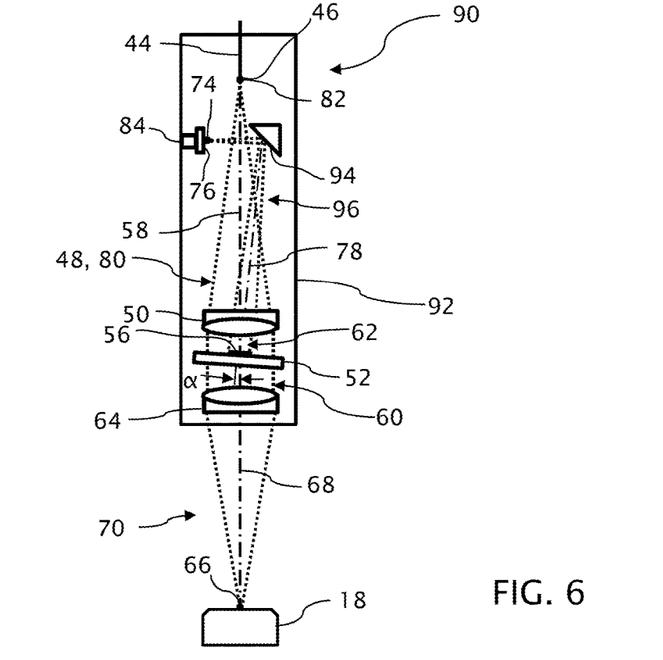
FIG. 6 is a diagram of alternative optical pen in which the reference arm is folded to provide a more compact configuration.

FIG. 6 depicts an alternative optical pen 90 in a more compact configuration featuring a narrower pen body 92, while accommodating the desired optical path length of the reference beam 62. Most of the components are the same as the optical pen 20 and are referenced by the same numerals. However, an intermediate reflector 94, such as a plane mirror, is added to fold a new reference arm 96 into a more compact configuration. As shown, the pathway of the reference beam 62, which can be divided out of the source beam 48 as described for the optical pen 20, is folded across the optical axis 58 of the first focusing optic 50, i.e., across the pathways of the source and measurement beams 48 and 80. Thus, more of the volume occupied by the reference beam 62 remains within the volume occupied by the source beam 48. In addition, the folded pathway of the reference beam 62 limits the radial offset of the reference beam 62 from the source beam 48 so that the pen body 92 can be narrower and/or more radially symmetric about the aligned optical axes 58 and 68 of the focusing optics.

In such a folded condition, the reference reflector 76 can have a surface normal oriented perpendicular to the optical axis 58 of the first focusing optic 50. This allows the reference reflector 76 to be positioned about the radial periphery of the pen body 92 in a location whereby the adjustment mechanism 84 is more easily accessible or subject to adjustment through the pen body 92. While remaining similarly accessible about the radial periphery of the pen body 92, the surface normal of the reference reflector 76 can be inclined from perpendicular to the optical axis 58 of the first focusing optic 50 by a small amount (e.g., 3 to 10 degrees), and the adjuster 84 can be arranged for translating the so inclined reference reflector 76 along the optical axis 58 to adjust the portion of the reference beam 62 that remains within the acceptance cone of the single mode fiber 44. The surface normal of the reference reflector 76, though inclined, still remains largely perpendicular to the optical axis 58 for supporting the crossed pathways of the source and reference beams 48 and 62. The inclination of the intermediate reflector 94 can be set to maintain the orientation of the reference beam 62 for retroreflection from the inclined reference reflector 76 so that the effect of the translation along the optical axis 58 is to variably defocus the reference beam 62 and thereby adjust the portion of the reference beam 62 that remains within the acceptance cone of the single mode fiber 44.

Figure 7:
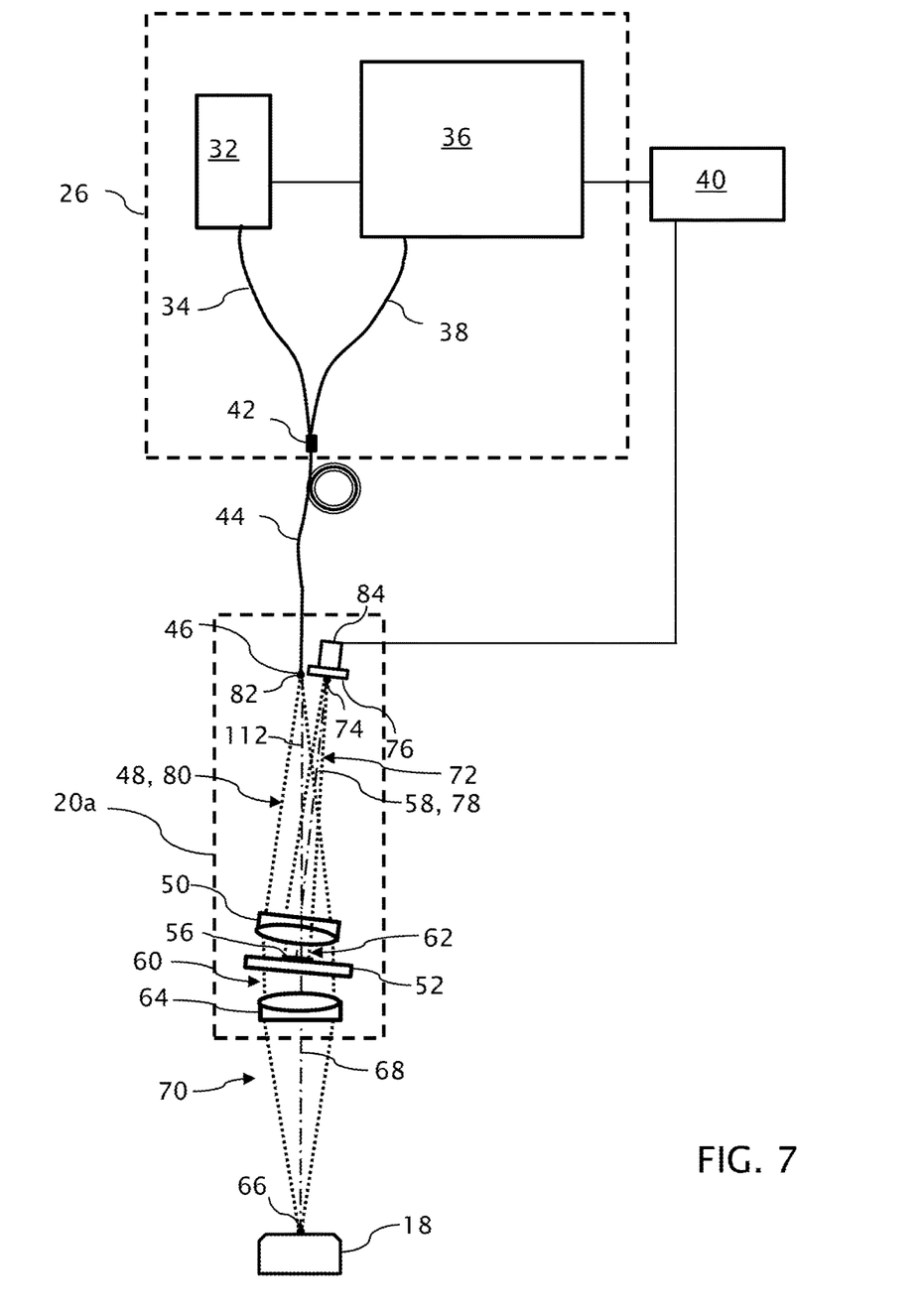
FIG. 7 is a diagram of an optical measurement system similar to the system of FIG. 2 but showing an optical pen with a different arrangement of focusing optics.

FIG. 7 depicts another alternative optical pen 110 in which the optical axis 58 of the first focusing optic 50 coincides with the optical axis 78 of the reference beam 62. The second focusing optic 64 and the object beam 60 continue to share the common optical axis 68 consistent with the previous embodiments. Thus, in the optical pen 110, both the reference beam 62 and the object beam 60 respectively propagate through the first and second focusing optics 50 and 64 as on-axis beams limiting a source of differences between the beams 60 and 62. However, the optical axis 58 of the first focusing optic 50 is inclined to the optical axis 68 of the second focusing optic 64. In addition, the optical axis 58 of the first focusing optic 50 is similarly inclined to a common optical axis 112 of the source beam 48 and the measurement beam 80, which propagate en route to and from the end 46 of the single mode fiber 44. The common optical axis 112 of the source beam 48 and the measurement beam 80 remains aligned with the optical axis 68 of the second focusing optic 64.

Within the pen body 20*a* of the optical pen 110, the high spatially coherent, low temporally coherent light conveyed by the optical fiber 44 is emitted from an end 46 of the single mode fiber 44 as the source beam 48 propagating as a diverging beam toward the first focusing optic 50. However, instead of being emitted from the end 46 of the single mode fiber 44 in a position along the optical axis 58 of the first focusing optic 50, the end 46 of the single mode fiber 44 is located within a focal plane of the first focusing optic 50 in a position offset from the optical axis 58 of the first focusing optic 50. As such, the focusing optic 50 is still arranged to collimate the source beam 48, but the source beam 48 is collimated in an orientation that is inclined to the optical axis 58 of the first focusing optic 50.

The beamsplitter 52 within the pen body 20*a* divides the collimated source beam 48 into (a) the object beam 60 that transmits through the beamsplitter 52 and (b) the reference beam 62 that is reflected by the beamsplitter 52 into alignment with the optical axis 58 of the first focusing optic 50. Thus, the optical axis 58 of first focusing optic 50 is inclined to the common optical axis 112 of the source and measurement beams 48, 80 by the amount that the reference beam 62 is intended to be inclined with respect to the source beam 48. For purposes of reflecting the reference beam 62 into alignment with the optical axis 58 of the first focusing optic 50, the surface normal of the reflective surface 56 of the beamsplitter 52 is relatively inclined to the common axis 112 of the source and measurement beams 48, 80 by one-half of this amount. Thus, in keeping with the previous embodiments, the surface normal of the reflective surface 56 of the beamsplitter plate 52 is inclined through angle α with respect to the optical axis 58, which is equal to one-half the angle of reflection (i.e., 2 α) at which the reference beam 62 is reflected by the beamsplitter 52. The same surface normal is also inclined through angle α with respect to the common axis 112 of the source and measurement beams 48, 80 resulting in the corresponding axes 58, 78 of the first focusing optic 50 and the reference beam 62 being inclined with respect to the common axis 112 of the source and measurement beams 48, 80 through angle 2α. Again, while shown exaggerated in FIG. 7 for purposes of illustration, the angle α is preferably no more than 3 degrees and is preferably approximately 1.5 degrees.

Similar to the preceding embodiments, the object beam 60 transmits through the beamsplitter 52 and propagates along the object arm 70 through the second focusing optic 64 within the pen body 20*a*, which focuses the object beam 60 to the object focus 66 beyond the pen body 20*a* proximate the test object 18. The object beam 60 shares the optical axis 68 of the second focusing optic 64, which is also preferably aligned with the common optical axis 112 of the source and measurement beams 48, 80 but is inclined to the optical axis 58 of the first focusing optic 50.

Upon reflection from the beamsplitter 52, the reference beam 62 propagates along the reference arm 72 back through the first focusing optic 50, which focuses the inclined reference beam 62 to the reference focus 74 proximate the reference reflector 76. Unlike the previous embodiments, the axis 78 of the reference beam 62 coincides with the optical axis 58 of the first focusing optic 50, which limits off-axis directional influences that could affect the reference beam 62 differently from the object beam 60. Nonetheless, the reference focus 74 of the reference beam 62 is spatially offset from the end 46 of the single mode fiber 44 by an amount corresponding to a function relating to the angle of reflection (2α) and the focal length of the first focusing optic 50. The offset enables the reference beam 62 to be retroreflected by the reference reflector 76 back to the first focusing optic 50 without interfering with the intended propagation of the source beam 48 from the end 46 of the single mode fiber 44 through the first focusing optic 50.

Although the beamsplitter 52 is depicted with a centrally disposed reflective surface 56, which limits the reference beam 62 to central or paraxial rays, the reflective surface 56 could be formed over all or a portion of either side of the transmissive plate 52 as a partially reflective surface, such as a so-called "half-silvered" surface, to support a similar beam splitting function. In this way, the reference beam 62 could be sized similar to the object beam 60 adding to the systematic correspondence between the two beams. However, as a partial reflector, unintended secondary encounters could occur associated with returning object or reference beams 60 or 62, but such secondary encounters are of reduced amplitude and tend to travel at relative path lengths beyond the range of measurement. For example, some returning rays of the reference beam 62 could reach the second focusing optic 64 at an off-axis angle and focus elsewhere on the test object 18. Light collected from the alternative focus could rejoin the reference beam 62 after having traveled twice the distance intended for the reference beam 62

Similar to the preceding embodiments, specular or diffuse reflections of the object beam 60 from the test object 18 are collected and re-collimated by the second focusing optic 64 en route back to the beamsplitter 52. Similarly, retroreflections from the reference reflector 76 are collected and substantially re-collimated by the first focusing optic 50 en route back to the beamsplitter 52. At the beamsplitter 52, at least a portion of the returning object beam 60 that transmits through the beamsplitter 52 is recombined with at least a portion of the returning reference beam 62 that reflects from the reflective surface 56 back into alignment with the object beam 60 as a common measurement beam 80, which is focused by the first focusing optic 50 to the measurement focus 82 proximate the end 46 of the single mode fiber 44. The end 46 of the single mode fiber 44 receives the measurement beam 80 through the volume of an acceptance cone, which is related generally to the refractive indices of the fiber core and cladding.

However, in contrast to the preceding embodiments, the re-collimated and aligned object and reference beams 60 and 62 now considered as the common measurement beam 80 encounter the first focusing optic at an off-axis angle (i.e., 2α) and are focused proximate to the end 46 of the single mode fiber 44, which is located within a focal plane of the first focusing optic 50 in a position offset from the optical axis 58 of the first focusing optic 50. As such, the first focusing optic 50 should be designed of sufficient quality to minimize aberrational (e.g., coma) effects that could adversely affect the size or shape of the measurement focus 82 relative to the acceptance cone at the end 46 of the single mode fiber.

Similar to the two preceding embodiments, the relative intensities of the object and reference beam contributions to the measurement beam 80 can be adjusted to better optimize the measured intensity variation by using an adjustable beam manipulator such as the linear adjuster 84, under the control of the processor 40 or other controller, for displacing the reference reflector 76 along the optical axis 78 of the reference beam 62 to variably defocus the reference beam 62 proximate the end 46 of the single mode fiber 44. Similar to the embodiment of FIG. 6, an intermediate reflector 94, such as a plane mirror, can be added to fold a new reference arm into a more compact configuration.

Those of skill in the art will appreciate that alternatives, variations, modifications, additions, and different combinations of the elements disclosed in the example embodiments may be made in accordance with the overall teaching of the invention and which are intended to be encompassed by the following claims.

The invention claimed is:

1. An optical pen for taking interferometric distance measurements over a plurality of points on a test object comprising:
    a pen body arranged for receiving an end of single mode optical fiber for conveying a source beam to the pen body and for conveying a measurement beam from the pen body;
    a first focusing optic supported by the pen body for collimating the source beam emitted from the end of the single mode fiber;
    a beamsplitter supported by the pen body for transmitting a first portion of the source beam as an object beam and for reflecting a second portion of the source beam as a reference beam at a non-normal angle of incidence back through the first focusing optic;
    a second focusing optic supported by the pen body for focusing the object beam beyond the pen body to an object focus proximate the test object and for collimating the object beam reflected from the test object as a returning object beam;
    a reference reflector for reflecting the reference beam as a returning reference beam back through the first focusing optic to the beamsplitter;
    the beamsplitter being arranged for transmitting the returning object beam and for reflecting the returning reference beam into alignment with the returning object beam thereby combining the returning object and reference beams into the measurement beam;
    the first focusing optic being arranged for focusing the measurement beam into the end of the single mode fiber;
    the first and second focusing optics having respective optical axes, and the optical axis of the first focusing optic is inclined to the optical axis of the second focusing optic; and
    beamsplitter being further arranged for transmitting the first portion of the source beam as the object beam along an object optical axis that is aligned with the optical axis of the second focusing optic and for reflecting the second portion of the source beam as the reference beam along a reference optical axis that is aligned with the optical axis of the first focusing optic.

2. The optical pen of claim 1 in which the object and returning object beams share the object optical axis that is aligned with the optical axis of the second focusing optic, and the reference and returning reference beams share the reference optical axis that is aligned with the optical axis of the first focusing optic.

3. The optical pen of claim 2 in which a common optical axis of the source and measurement beams is aligned with the optical axis of the second focusing optic.

4. An optical pen for taking interferometric distance measurements over a plurality of points on a test object comprising:

a pen body arranged for receiving an end of single mode optical fiber for conveying a source beam to the pen body and for conveying a measurement beam from the pen body;

a first focusing optic supported by the pen body for collimating the source beam emitted from the end of the single mode fiber;

a beamsplitter supported by the pen body for transmitting a first portion of the source beam as an object beam and for reflecting a second portion of the source beam as a reference beam at a non-normal angle of incidence back through the first focusing optic;

a second focusing optic supported by the pen body for focusing the object beam beyond the pen body to an object focus proximate the test object and for collimating the object beam reflected from the test object as a returning object beam;

a reference reflector for reflecting the reference beam as a returning reference beam back through the first focusing optic to the beamsplitter;

the beamsplitter being arranged for transmitting the returning object beam and for reflecting the returning reference beam into alignment with the returning object beam thereby combining the returning object and reference beams into the measurement beam;

the first focusing optic being arranged for focusing the measurement beam into the end of the single mode fiber; and an intermediate reflector for folding a pathway of the reference beam en route to and from the reference reflector.

5. The optical pen of claim 4 in which the first focusing optic includes an optical axis and the beamsplitter includes an at least partially reflective surface that is inclined at a non-normal angle to the optical axis of the first focusing optic.

6. The optical pen of claim 5 in which the at least partially reflective surface departs by no more than three degrees from a normal to the optical axis of the first focusing optic.

7. The optical pen of claim 4 in which the reference and returning reference beams share a reference optical axis, and the reference optical axis is inclined with respect to the optical axis of the first focusing optic.

8. The optical pen of claim 7 in which a common optical axis of the source and measurement beams is aligned with the optical axis of the first focusing optic.

9. The optical pen of claim 8 in which the object and returning object beams share an object optical axis, and the object optical axis is aligned with the optical axis of the second focusing optic.

10. The optical pen of claim 9 in which the optical axis of the first focusing optic is aligned with the optical axis of the second focusing optic.

11. The optical pen of claim 4 in which the partially reflective surface of the beamsplitter reflects central or paraxial rays of the source beam along a reference optical axis that is inclined to a common optical axis of the source and measurement beams without similarly reflecting more marginal rays of the source beam which form the object beam.

12. The optical pen of claim 4 in which the beamsplitter is formed as a transmissive plate including the at least partially reflective surface, and the transmissive plate is inclined at the non-normal angle to the optical axis of the first focusing optic.

13. The optical pen of claim 12 in which the transmissive plate includes front and back surfaces inclined at the non-normal angle to the optical axis of the first focusing optic and the at least partially reflective surface is a formed as a reflective coating occupying a portion of one of the front and back surfaces centered about the optical axis of the first focusing optic.

14. The optical pen of claim 4 in which the beamsplitter includes a centrally disposed reflector that is inclined at the non-normal angle to the optical axis of the first focusing optic and is bordered by a transmissive region.

15. The optical pen of claim 14 in which the centrally disposed reflector is shaped as a disc.

16. The optical pen of claim 14 in which the centrally disposed reflector is shaped as and annulus.

17. The optical pen of claim 4 in which the source and measurement beams include a common optical axis aligned with the end of the optical fiber, and the intermediate reflector folds the pathway of the reference beam across the common optical axis of the source and measurement beams.

18. The optical pen of claim 4 in which (a) the end of the single mode fiber defines an acceptance cone through which light enters the single mode fiber, (b) the reference beam and returning reference beam share a reference optical axis, and (c) the reference reflector is adjustable along the reference optical axis to defocus the returning reference beam for balancing beam energies between the returning reference beam and the returning object beam portions of the measurement beam within the acceptance cone at the end of the single mode fiber.

19. The optical pen of claim 4 in which (a) the partially reflective surface is centered within a portion of the beamsplitter for reflecting central or paraxial rays of the source beam without also reflecting more marginal rays of the source beam which form the object beam, (b) the first focusing optic has a focal length, and (c) the reference reflector is positioned along the reference optical axis at an optical distance from the first focusing optic that is substantially equal to or greater than the focal length of the first focusing optic so that the returning reference beam does not expand beyond the partially reflective surface.

20. The optical pen of claim 4 in which (a) the object beam and returning object beam travel along an object optical axis between the beamsplitter and the object focus through a first optical distance, (b) the reference beam and returning reference beam travel along a reference optical axis between the beamsplitter and the reference reflector through a second optical distance, and (c) the first and second optical distances are offset by an amount to avoid a null interference condition.

21. The optical pen of claim 20 in which the optical pen has a range of measurement and the amount of offset between the first and second optical distances is at least midway of the measurement range.

22. The optical pen of claim 4 in which the first and second focusing optics are corrected to limit chromatic dispersion, and dispersions associated with transmissions of light comprising the reference beam through the first focusing optic are matched to transmissions of light comprising the object beam through the first and second focusing optics.

23. A method of taking interferometric distance measurements over a plurality of points on a test object with an optical measurement system having an optical pen connected to both a light source and a detector through a single mode fiber, comprising steps of:

collimating a source beam emitted from an end of the single mode fiber through a first focusing optic of the optical pen;

dividing the collimated source beam at a beamsplitter into (a) an object beam that is transmitted through a second focusing optic of the optical pen to an object focus proximate a test object and (b) a reference beam that is reflected at a non-normal angle of incidence back through the first focusing optic to a reference reflector of the optical pen;

collimating the object beam reflected from the test object as returning object beam through the second focusing optic;

collimating the reference beam reflected from the reference reflector as a returning reference beam through the first focusing optic; and combining the returning object and reference beams at the beamsplitter into a measurement beam that is transmitted through the first focusing optic on a converging path to the end of the single mode fiber, wherein the source and measurement beams and the object and returning object beams propagate along respective optical axes in alignment with an optical axis of the second focusing optic and the end of the single mode fiber, and wherein the reference and returning reference beams propagate along a reference optical axis in alignment with an optical axis of the first focusing optic and at an inclination with respect to the optical axis of the second focusing optic.

24. The method of claim 23 in which the step of combining the returning object and reference beams includes transmitting the returning object beam through the beamsplitter and reflecting the returning reference beam from the beamsplitter into alignment with the returning object beam.

25. The method of claim 23 in which the source beam includes an instantaneous or sequentially established bandwidth spanning a range of wavelengths.

26. The method of claim 23 including a step of focusing the measurement beam into the end of the single mode fiber within an acceptance cone of the single mode fiber.

27. The method of claim 23 in which the step of dividing the collimated source beam at a beamsplitter includes reflecting a portion of the source beam as the reference beam in a direction that is inclined to the optical axis of the second focusing optic by no more than six degrees.

28. The method of claim 27 in which the direction at which the source beam is reflected as the reference beam is inclined to the optical axis of the second focusing optic by no more than three degrees.

29. The method of claim 27 in which the step of reflecting the portion of the source beam as the reference beam includes reflecting central or paraxial rays of the source beam without similarly reflecting more marginal rays of the source beam which form the object beam.

30. A method of taking interferometric distance measurements over a plurality of points on a test object with an optical measurement system having an optical pen connected to both a light source and a detector through a single mode fiber, comprising steps of:

collimating a source beam emitted from an end of the single mode fiber through a first focusing optic of the optical pen;

dividing the collimated source beam at a beamsplitter into (a) an object beam that is transmitted through a second focusing optic of the optical pen to an object focus proximate a test object and (b) a reference beam that is reflected at a non-normal angle of incidence back through the first focusing optic to a reference reflector of the optical pen;

collimating the object beam reflected from the test object as returning object beam through the second focusing optic;

collimating the reference beam reflected from the reference reflector as a returning reference beam through the first focusing optic;

combining the returning object and reference beams at the beamsplitter into a measurement beam that is transmitted through the first focusing optic on a converging path to the end of the single mode fiber; and reflecting both the reference beam and the returning reference beam along a folded pathway en route to and from the reference reflector.

31. The method of claim 30 in which the folded pathway intersects a pathway of the source and measurement beams so that more of a volume occupied by the reference and returning reference beams remains within a volume occupied by the source and measurement beams.

32. The method of claim 30 including a step of matching chromatic dispersions associated with transmissions of light comprising the reference beam through the first focusing optic to chromatic dispersions associated with transmissions of light comprising the object beam through the first and second focusing optics.

33. The method of claim 30 in which the reference beam propagates from the beamsplitter to the reference reflector along a reference optical axis, and including a step adjusting the reference reflector along the reference optical axis to defocus the returning reference beam for balancing beam energies between the returning reference beam and the returning object beam portions of the measurement beam within an acceptance cone at the end of the single mode fiber.

34. The method of claim 30 in which (a) the step of dividing the collimated source beam at a beamsplitter includes reflecting a portion of the source beam as the reference beam in a direction that is inclined to an optical axis of the first focusing optic and (b) the step of reflecting the portion of the source beam as the reference beam includes reflecting central or paraxial rays of the source beam without similarly reflecting more marginal rays of the source beam which form the object beam, and including a step of positioning the reference reflector at an optical distance from the first focusing optic that is substantially equal to or greater than a focal length of the first focusing optic.

35. The method of claim 30 in which (a) the object beam and returning object beam travel along an object optical axis between the beamsplitter and the object focus through a first optical distance and (b) the reference beam and returning reference beam travel along a reference optical axis between the beamsplitter and the reference reflector through a second optical distance, and including a step of offsetting the first and second optical distances by a minimum amount to avoid a null interference condition.

36. The method of claim 30 including steps of transmitting the source beam from the light source along the single mode fiber to the optical pen and transmitting the measurement beam along the single mode fiber to the detector.

37. The method of claim 30 in which the step of dividing the collimated source beam at a beamsplitter includes reflecting a portion of the source beam as the reference beam in a direction that is inclined to both a common optical axis of the source and measurement beams and an optical axis of the first focusing optic.

38. The method of claim 37 in which the step of dividing the collimated source beam at a beamsplitter includes transmitting a portion of the source beam as the object beam in a direction that is aligned with both the common optical axis of the source and measurement beams and the optical axis of the first focusing optic.

39. The method of claim 37 in which the step of dividing the collimated source beam at a beamsplitter includes transmitting a portion of the source beam as the object beam in a direction that is aligned with both the common optical axis of the source and measurement beams and an optical axis of the second focusing optic.

* * * * *